United States Patent [19]

Gladu

[11] 4,288,254
[45] Sep. 8, 1981

[54] PREDISPERSED SLURRY OF TITANIUM DIOXIDE

[75] Inventor: Yves Gladu, Quebec, Canada

[73] Assignee: NL CHEM Canada Inc., Montreal, Canada

[21] Appl. No.: 151,120

[22] Filed: May 19, 1980

Related U.S. Application Data

[63] Continuation-in-part of Ser. No. 61,515, Jul. 27, 1979, abandoned.

[51] Int. Cl.³ .................................................. C09C 1/36
[52] U.S. Cl. ..................................... 106/300; 423/610
[58] Field of Search ................. 106/300, 309; 423/610

[56] References Cited

U.S. PATENT DOCUMENTS

| | | | |
|---|---|---|---|
| 3,702,773 | 11/1972 | Hall et al. | 106/300 |
| 3,758,322 | 9/1973 | Roberts | 106/300 |
| 3,772,046 | 11/1973 | Knapp et al. | 106/300 |
| 3,847,640 | 11/1974 | Daubenspeck et al. | 106/300 |
| 4,042,557 | 8/1977 | Dills | 106/300 |
| 4,177,081 | 12/1979 | De Colibus | 106/300 |

FOREIGN PATENT DOCUMENTS 656373 11/1964 Belgium .

Primary Examiner—O. R. Vertiz
Assistant Examiner—Mark Bell
Attorney, Agent, or Firm—Gary M. Nath; Eugene Striffler

[57] ABSTRACT

A process is disclosed for preparing a slurry of titanium dioxide having a solids content of at least 60%. In the past titanium dioxide pigment slurries have been prepared by mixing titanium dioxide powder, water and additives in a batch mixer, however, this is a lengthy process and generally results in some agglomeration of the particles. The present process comprises the steps of mixing titanium dioxide pigment, at least one dispersant additive and water to a first mixture having a solids content of at least about 60%, pumping the first mixture through a disperser mill to produce a second mixture free from agglomerates.

12 Claims, 2 Drawing Figures

PREDISPERSED SLURRY OF TITANIUM DIOXIDE

This is a continuation-in-part of application Ser. No 61,515 filed July 27, 1979, now abandoned.

The present invention relates to the slurrying of titanium dioxide pigments for use in paints. More specifically, the invention relates to producing a predispersed slurry of rutile titanium dioxide finished or refined pigments either on a batch or a continuous process which is free from agglomerates and may be stored for some time without separating.

Titanium dioxide is used as a base for most paints made today. It is also used in other applications such as paper making and other types of coating compositions. In the production of titanium dioxide pigments, crude titanium dioxide is ground in an aqueous suspension to a fine powder form and the particles are subjected to a wet coating process. After the wet coating step the pigment is washed and dewatered on a leaf or rotary filter to form a wet filter cake. The filter cake is generally dried and milled with an organic compound into powder to improve the dispersion characteristics of the pigment. The resulting powder is shipped to end users where the finished titanium dioxide pigment powder is in most cases formed into an aqueous slurry for the production of paints, coatings and the like. Titanium dioxide pigments are prepared in two crystalline forms, anatase and rutile. The present invention relates generally to the rutile form of the pigment.

In one process for preparing an aqueous slurry of the finished pigment, the finished titanium dioxide pigment powder is mixed with dispersants and other additives and water in a batch mixer and stirred for a long time until the required percentage of solids and degree of dispersion is achieved in the slurry. Storage tanks hold the mixed slurry, but there must always be some agitation occurring in the tanks to prevent the titanium dioxide pigments in the slurry from settling. In the past it has always been difficult to make rutile slurries with high percentage solids that retain their rheological properties and yet if the percentage solids is too low, the slurry cannot be used in water base paints. The shipment of high solid aqueous compositions has certain advantages to the end users because they do not have to proceed with the rather complex and timely process of mixing titanium dioxide pigments and water. However, it also presents some disadvantages in that you are shipping large amounts of water over fairly long distances and this is inefficient particularly in times of energy and fuel crises.

A method of forming high solids content pigment slurries is disclosed in U.S. Pat. No. 3,758,322 to Roberts et al wherein a titanium dioxide wet treated pigment slurry is flocculated prior to dewatering and subsequently reslurried with a dispersant. Belgian Pat. No. 656,373 to British Titan Products Company Limited discloses another method of making an aqueous solution of titanium dioxide pigment from a wet filter cake by the addition of a natural or synthetic hydrosoluble polymer to prevent sedimentation. U.S. Pat. No. 3,847,640 to Daubenspeck et al discloses that the percentage solids of a high oil absorption pigment slurry must be within a critical range or deterioration occurs in the tinting strength. Daubenspeck discloses a dispersator fitted with a Cowles-type blade for vigorously agitating the slurry.

The present invention provides a process for preparing a predispersed slurry of finished or refined rutile titanium dioxide pigments having a high solid content. The process allows the predispersed slurry to be prepared simply and fast either by batch or continuous process. The predispersed slurry may be stored for considerable periods of time without settling, although occasional agitation in a storage tank is preferred. The present predispersed slurry has been found to remain free from agglomerates in a storage tank for up to three months.

The present invention provides a process for preparing a predispersed slurry of finished rutile titanium dioxide having a solids content of at least 60% comprising the steps of, mixing finished titanium dioxide pigment, at least one dispersant additive and water to a first mixture having a solids content of at least about 60%, pumping the first mixture through a disperser mill to produce a second mixture free from agglomerates.

In drawings which illustrate embodiments of the invention:

Rutile titanium dioxide pigments are calcined and wet treated. In the wet treating process a coating is added to the pigment particles. The coated pigment is then washed and de-watered to form a wet filter cake. In some cases the wet cake may be used for making the finished slurry, if so a milling step is required to break up the agglomerates in the pigment. This milling step may be a sand milling step or other wet grinding apparatus.

In some cases it is preferred to make dry powder before forming the finished slurry. The filter cake is dried in a tunnel dryer or spray dryer to a dry powder which is then milled in a fluid energy mill.

Figure 1:
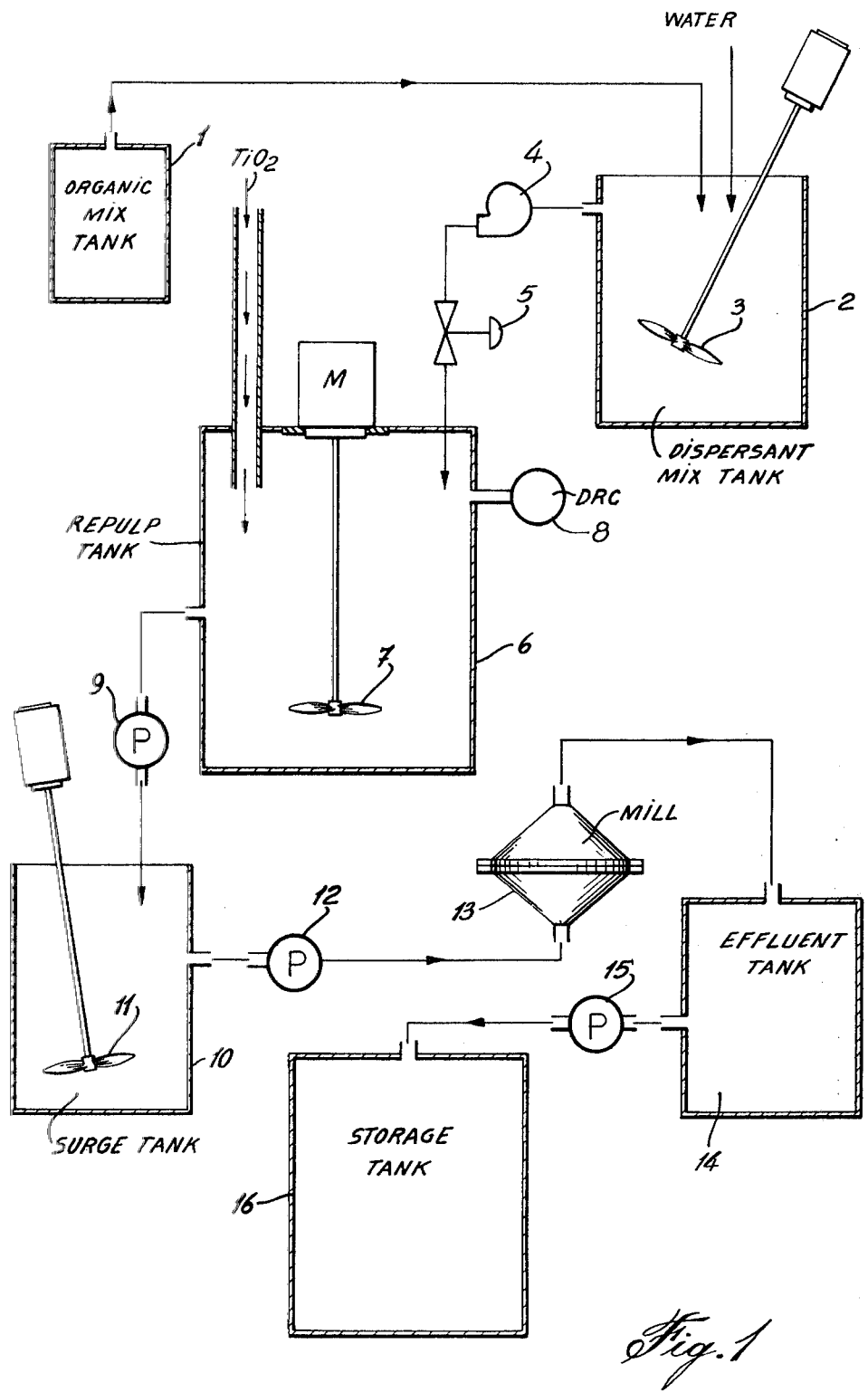
FIG. 1 is a flow diagram of one embodiment of the present invention.

Referring to FIG. 1, an organic mix tank 1 is provided wherein a dispersant additive is mixed with a minimal amount of water. Other additives may also be added such as biocides, to prevent fungus growth in the stored tanks, anti settling agents, caustic to adjust pH and anti foaming agents. The additives in the organic mix tank 1 are fed to a dispersant mix tank 2 which has an agitator 3 therein. Water is added to this dispersant mix tank 2 at the desired ratio so that the correct ratio between the water, additives and titanium dioxide is obtained. An organic mix tank 1 is not essential, if the dispersant mix tank 2 is large enough then the dispersant and other additives may all be mixed together in the dispersant mix tank 2. The mixture of water and additives from the dispersant mix tank 2 is pumped by means of a centrifugal pump 4 through an automatic valve 5 into the repulp tank 6 and mixed with the finished titanium dioxide pigment which is fed into the tank 6. The finished titanium dioxide pigment may be in dry powder form, or wet filter cake that has been milled to break up the agglomerates. The ratio between the titanium dioxide pigment, water and additives is controlled partially by the automatic valve 5 and partially by controlling the flow of titanium dioxide into the repulp tank 6, so that the correct solids content of the resulting slurry is obtained. In one embodiment slurries are sold at 76% for the high gloss or semi-gloss paints, or 63% for the low-gloss paints. An agitator 7 mixes the titanium dioxide pigments with the water and additives in the repulp tank 6 and a density recorder and controller 8 measures the specific gravity in the repulp tank 6. This measuring controller 8 is used to control the flow of water and additives from the dispersant mix tank 2 through the automatic valve 5. Thus, if the specific gravity is insufficiently high then the automatic valve 5 is adjusted accordingly.

If in powder form the titanium dioxide pigment is fed into the repulp tank 6 from bags of prepared titanium dioxide pigment, or by means of a conveyor directly from a micronizer. If the pigment is in the form of milled wet cake the resulting fluid may be fed from a container or by means of a pump from the mill. In the case of a batch system, a predetermined quantity of the mixture of additives and water is fed into the repulp tank, 6, followed by a weighed amount of pigment. In the case of a continuous process then the flow rate of the titanium dioxide pigment fed into the repulp tank 6 is controlled by a screw conveyor (not shown) or other type of feeding device and the flow of the water and additives from the dispersant mix tank 2 is controlled by the automatic valve 5. This predispersing step may occur at a plant where the finished titanium dioxide pigment is shipped to the plant in paper bags. However, in some cases the slurrying process may occur in the titanium dioxide plant itself, in which case the finished titanium dioxide pigment is fed to the repulp tank 6. In the case of a powder the pigment is fed directly from a fluid energy mill, and in the case of filter cake directly from a sand mill. The water and additives are fed into the repulp tank 6 simultaneously and the mixture is continually mixed by the agitator 7.

A diaphragm pump 9 pumps the first mixture from the repulp tank 6 into a surge tank 10 which has a further agitator 11, to ensure the mixture does not settle. In this condition, the suspension contains pigment or soft agglomerates of pigment which tend to settle out. It may not be used for paints or other products in this condition, but may be stored in surge tanks with agitators if necessary while awaiting to be pumped through the disperser mill. A further diaphragm pump 12 feeds the first mixture from the surge tank 10 to the underside of the disperser mill 13.

Figure 2:
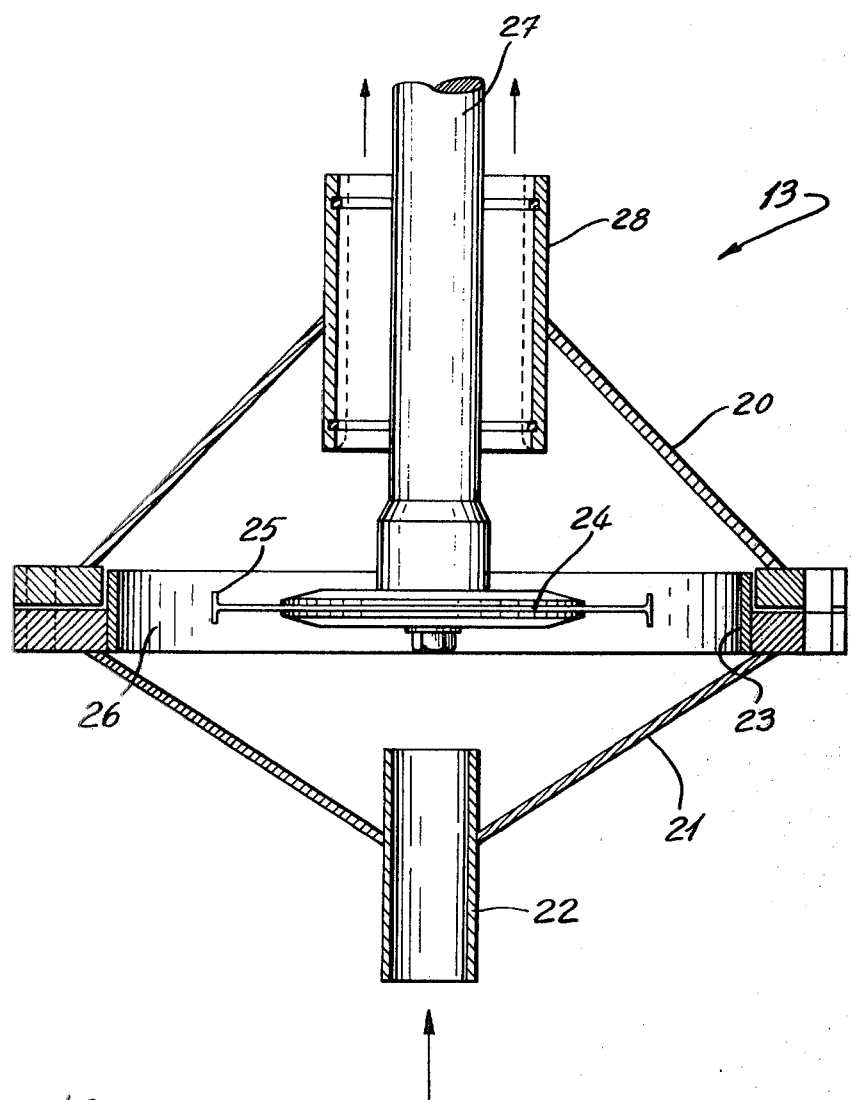
FIG. 2 is a cross sectional elevation of one embodiment of a disperser mill used in the process of the present invention.

The disperser mill has an impeller mounted on a shaft that rotates to give an impeller peripheral speed in the range of about 4,700 to 11,300 feet per minute. The rotational speed of the shaft is dependent upon the required peripheral speed. If the peripheral speed is too slow then insufficient dispersion occurs in the slurry, if the peripheral speed is too high, then the coating may be stripped off the titanium dioxide pigment particles which is not acceptable, and the slurry may heat up to a temperature where organic chemicals sensitive to heat are destroyed. FIG. 2 illustrates one embodiment of a disperser mill having a vessel formed from a conical shaped top half 20 and an inverted conical shaped bottom half 21. The first mixture enters through a tubular inlet 22 in the centre of the bottom half 21. Between the top half 20 and the bottom half 21 is a wear ring 23, and an impeller 24 having rotating blades 25 which rotate within this wear ring 23 leaving an annular space 26 through which the mixture must pass. The impeller 24 is supported by a shaft 27 which extends downwards through an annular outlet 28 in the centre of the top half 20 of the vessel.

In one embodiment the disperser mill has an impeller with rotating blades attached to the periphery which rotates at a shaft speed of about 2600 rpm. The periphery of the rotating blades has a diameter of 12 inches which results in an impeller peripheral speed of about 8,100 feet per minute. The inside diameter of the wear ring 23 is 16½ inches. The first mixture is fed from underneath and passes upwards from the inlet 22 through the annular space 26 between the high speed rotating blades 25 on the impeller 24 and the wear ring 23 in the mill 13. This annular space 26 is a high shear zone, and shearing action occurs to the first mixture which effects the consistency of the mixture and renders it free from agglomerates. The upward flow through the mill 13 is in one embodiment 40 liters per minute, however, the flow rate is not limited to this figure, but depends mainly on the quality balance of the mill effluent with throughput. In one embodiment the mill may be similar to that shown in U.S. application Ser. No. 62,344 filed July 31, 1979 to J. G. Menard.

The mixture leaving the mill 13 flows into an effluent tank 14 which acts as a surge tank and is then pumped by a further diaphragm pump 15 into at least one storage tank 16. It has been found that the resultant mixture in the storage tank 16 remains in a homogenized state for two or three months with minimum agitation. A small mixing arm or agitator in the storage tank together with a timing device provides minimum agitation for short periods and ensures settling does not occur.

Whereas a continuous process has in general been described and shown in the flow diagram, it will be apparent to those skilled in the art that a batch process could equally well be carried out wherein a batch of titanium dioxide pigment is added to the repulp tank 6 which had first been filled with the required quantity of water and additives. After the initial mixing in the repulp tank the slurry is pumped directly through the disperser mill 13 into a storage tank 16. The surge tank 10 and the effluent tank 14 are not essential in either a batch or a continuous process, but are for convenience and may be used as sampling points.

EXAMPLE

A batch of finished rutile titanium dioxide pigment powder was prepared into a slurry at 62.17 solids content. The titanium dioxide was commercially available and known under the trake mark Titanox 2131. The formula and the amounts of reagents required for the preparation of this batch are listed in Table 1.

TABLE 1

| | Weight (KG) | % In Slurry | % On Pigment |
|---|---|---|---|
| WATER | 6963 | 36.61 | — |
| NaOH (50%) | 15.1 | 0.08 | 0.064 (100%) |
| BENTONE LT (1% SOLN) | 62.5 | 0.33 | 0.0053 (100%) |
| BALAB 748 | 1.9 | 0.01 | 0.016 |
| VANCIDE TH* | 13.3 | 0.07 | 0.113 |
| KTPP (Potassium tripolyphosphate | 100 | 0.527 | 0.85 |
| POLYWET ND-2 (25% active) (Uniroyal Chemical) | 70.8 (as received) | 0.375 | 0.15 |
| PIGMENT Titanox 2131 (520 bags) | 11,793 | 62.0 | — |
| (19 metric tons) | 19,020 kg | 100.00 | |

*The Vancide TH was added in the storage tank.

The total amount of dispersant additive is 1% on pigment basis as determined by the dispersion demand test using ND-2/KTPP (dispersant demand plus 0.5%) 85% of this amount was added as KTPP and 15% as Polywet ND-2.

The repulp tank was equipped with a 30 H.P. motor having a shaft speed of 84 r.p.m. The tank was 8½ feet in diameter and 8 feet high. The agitator had a radial turbine at the bottom and an axial turbine about 3 feet above the radial turbine.

Water and the necessary reagents which were pre-weighed were added in the order shown in Table 1. The Vancide TH was added in the storage tank. The addition of the first 10 tons was made at an average rate of 160 kg per minute with the remainder of the pigment added at an average rate of 34 kg per minute. The last two tons were added at a slower rate to allow a better wetting of the pigment. The batch was left under agitation to allow some lumps at the surface to be broken and wetted. After the mixture in the repulp tank had been mixed for approximately one hour, a sample of the slurry was taken for the purpose of analysing the percentage solids which were determined at 64.16%. Percentage solids were determined by a standard method after setting for one hour at a temperature of 105° C. The 325 mesh unbrushed residue was determined at 0.19%. At this point 370 liters of water were added to lower the solids ratio to 63%.

The disperser mill had a 16½ inch internal diameter, equipped with an additional ¾ inch thick wear ring and 11-5/8 inch stainless steel Cowles type impeller with 7/16 inch teeth powdered by 125 HP motor (shaft speed 2,555 r.p.m.). The flow of slurry was adjusted to 40 liters per minute. The amperage drawn by the motor was 60 on the ammeter and the temperature of the slurry in the effluent tank was 46° C. The milling was completed in approximately 2½ hours. The dispersed slurry was stored in the storage tank and the properties of the solids were evaluated, the results are listed in Table 2.

TABLE 2

| PROPERTIES | RE-PULP TANK | EF-FLUENT TANK | STOR-AGE TANK | STOR-AGE TANK |
|---|---|---|---|---|
| SPECIFIC GRAVITY | — | — | 1.832 | 1.816 |
| % SOLIDS | 64.16* | 63.25 | 62.93 | 62.1 |
| RHEOLOGY | nil | 2200/18 | 1850/18 | 2200/9.0 |
| 10 RPM BROOKFIELD VISCOSITY | 100 cps | 50 | 120 | 100 |
| 100 RPM | 98 cps | 60 | 85 | 82 |
| + 325 MESH RESIDUE (Unbrushed) | 0.19% | — | — | 0.032 |
| pH | — | — | 8.4 | 8.4 |

*Before the addition of 370 liters of water.
**After the addition of 275 liters of water.

Samples were taken during the milling of the slurry and later in the storge tanks and the results indicated that the physical properties of the slurry were within saleability specifications. It is apparent from the 0.19% 325 mesh residue figure from the repulp tank, that considerable improvement is made to only 0.032% 325 mesh residue in the storage tank after the process. This illustrates the improvement in dispersion for the process. The resulting slurry is practically free from all agglomerates.

The embodiments of the invention in which an exclusive property or privilege is claimed are defined as follows:

1. A process for preparing a dispersed slurry of dispersant coated rutile titanium dioxide which comprises:
   a. preparing a dispersant coated titanium dioxide slurry having a solids content of at least about 60% by weight by mixing rutile titanium dioxide; at least one dispersant additive, and water;
   b. passing the dispersant coated titanium dioxide slurry directly through a high shear mill having an impeller peripheral speed sufficient to de-agglomerate the titanium dioxide but prevent stripping the coating from the titanium dioxide; and
   c. recovering a substantially agglomerate-free rutile titanium dioxide slurry having a solids content of at least 60% by weight.

2. The process according to claim 1 wherein the titanium dioxide is in dry powder form prior to mixing.

3. The process according to claim 1 wherein the titanium dioxide is in fluid form prior to mixing.

4. The process according to claim 1 wherein the dispersant additive, other additives and water are first mixed in a dispersant mix tank and then pumped to a repulp tank and mixed with the titanium dioxide pigment to produce the first mixture.

5. The process according to claim 4 wherein density is measured in the repulp tank and used as a control for the ratio of titanium dioxide pigment, dispersant additives and water.

6. The process according to claim 4 wherein the dispersant coated titanium dioxide slurry is pumped through a surge tank and agitated within the surge tank prior to being pumped through the disperser mill.

7. The process according to claim 1 wherein the disperser mill has an impeller with rotating blades that rotate at a peripheral speed in the range of about 4700 to 11,300 feet per minute.

8. The process according to claim 7 wherein the dispersant coated titanium dioxide slurry passes through an annular space representing an area of high shear zone between the rotating blades and a wear ring within the disperser mill.

9. The process according to claim 8 wherein the flow of slurry through the disperser mill is upwards.

10. The process according to claim 8 wherein the rotating blades of the disperser mill has about a 12 inch diameter periphery and has a peripheral speed of about 8100 feet per minute.

11. The process according to claim 7 wherein the dispersant coated titanium dioxide slurry is pumped through the disperser mill at a flow rate of about 40 liters per minute.

12. The process according to claim 4 wherein the substantially agglomerate-free rutile titanium dioxide slurry is fed to an effluent tank and then pumped to at least one storage tank.

* * * * *